(12) United States Patent
Terato

(10) Patent No.: US 6,755,981 B2
(45) Date of Patent: Jun. 29, 2004

(54) AQUARIUM CLEANING SYSTEM

(76) Inventor: Kuniaki Terato, 8500 148th Ave. NE., Redmond, WA (US) 98052

( * ) Notice: Subject to any disclaimer, the term of this patent is extended or adjusted under 35 U.S.C. 154(b) by 34 days.

(21) Appl. No.: 10/313,816

(22) Filed: Dec. 5, 2002

(65) Prior Publication Data

US 2003/0116489 A1 Jun. 26, 2003

Related U.S. Application Data

(63) Continuation-in-part of application No. 10/027,956, filed on Dec. 20, 2001, now Pat. No. 6,533,928.

(51) Int. Cl.[7] .............................................. A01K 63/04
(52) U.S. Cl. ....................... 210/805; 210/806; 210/169; 210/282; 210/416.2; 119/259
(58) Field of Search ................................ 210/169, 263, 210/282, 416.2, 903, 908, 767, 805, 806, 807; 119/259, 264

(56) References Cited

U.S. PATENT DOCUMENTS

| | | | | |
|---|---|---|---|---|
| 2,595,965 A | * | 5/1952 | Ludwick ..................... 119/264 |
| 2,672,845 A | * | 3/1954 | Schneithorst ............... 119/262 |
| 3,688,907 A | * | 9/1972 | Oravec ........................ 210/169 |
| 3,722,685 A | * | 3/1973 | Orensten et al. ............ 210/169 |
| 3,814,254 A | * | 6/1974 | Schatz ......................... 210/169 |
| 4,265,751 A | * | 5/1981 | Willinger .................... 210/169 |
| 4,684,462 A | * | 8/1987 | Augustyniak ................ 210/97 |
| 5,179,911 A | * | 1/1993 | Chow et al. ................. 119/264 |
| 5,190,647 A | * | 3/1993 | Balestrieri .................. 210/169 |
| 5,542,451 A | * | 8/1996 | Foster .................... 137/625.11 |
| 5,866,018 A | * | 2/1999 | Hyde et al. ................. 210/787 |
| 6,533,928 B1 | * | 3/2003 | Terato ......................... 210/169 |
| 6,641,732 B1 | * | 11/2003 | Cheyne ....................... 210/615 |

* cited by examiner

Primary Examiner—Fred G. Prince
(74) Attorney, Agent, or Firm—Janet Sleath; Victor N. King

(57) ABSTRACT

A water circulation and filtration system for maintaining a high level of water quality in aquariums is provided. In one embodiment, the inventive system comprises a vertical water flushing tube connected to a water supply or a reverse power-head pump and having an opening positioned in proximity to the base of the aquarium. A water circulation tube and water draining tube, each of which has openings located immediately above the base of the aquarium, are provided at the opposing end of the aquarium. The water circulation tube is connected at its other end to a standard filter, while the water draining tube is connected at its other end to a hose leading to a sink, drain or external container. In a second embodiment, water from the aquarium passes through a water draining tube to a filtration chamber which is connected in series to at least one additional filtration chamber. A pump is connected to the final filtration chamber and positioned, in the direction of water flow, after the final filtration chamber. Filtered water passes from the final filtration chamber into the aquarium by means of a water draining tube.

11 Claims, 9 Drawing Sheets

AQUARIUM CLEANING SYSTEM

CROSS-REFERENCE TO RELATED APPLICATIONS

This application is a continuation-in-part of prior U.S. patent application Ser. No. 10/027,956, filed Dec. 20, 2001 now U.S. Pat. No. 6,533,928.

FIELD OF THE INVENTION

This invention is in the field of water circulation and filtration systems for both freshwater and salt-water aquariums.

BACKGROUND OF THE INVENTION

The maintenance of high water quality in aquariums is essential for successfully keeping many breeds of fish and other aquatic organisms. For example, it is the dream of every discus fish hobbyist to decorate their living space with plant-containing aquariums in which large discus fish live comfortably. However, it is not only labor-intensive, but also impractical for amateur hobbyists, or even professional breeders, to keep discus fish in tanks with plants due to the fact that discus require ultra clean water. The major source of contamination in an aquarium tank is debris from leftover food, plant and animal waste accumulated under the gravel, with the resulting release of excessive amounts of toxic metabolites and substances such as ammonium and organic acids from decaying substances. In addition, the presence of such debris promotes the growth of infectious bacteria and fungi. It is therefore strongly recommended that aquariums with discus fish do not contain any kind of bottom substrate in order to avoid the accumulation of debris. The only way to make a more attractive discus tank is to decorate the tank with individually potted plants, thereby lowering the aesthetic quality of the aquarium.

Various filter systems have been invented to maintain water quality in an aquarium tank. Regardless of the different features of individual filtration systems, all systems fail to work for a prolonged period. For example, under gravel filtration systems have been widely used. However, accumulation of insoluble debris between and under the pieces of gravel is significant, since no debris is removed from the tank. Therefore, this system requires a complete, periodic cleaning of the gravel, which is labor intensive. Other examples of filter systems, which are currently popular include outside filter systems that hang onto the side of the aquarium, top on filters, canister filters, and sump systems. However, these systems have similar problems to the gravel filtered systems, since insoluble debris is not removed effectively and accumulates between and under gravel pieces. Another disadvantage of using an outside filter is that anaerobic regions form within the bottom substrates due to a lack of water circulation. Therefore, many hobbyists, regardless of the type of systems used, have experienced a sudden death of animals. To prevent this, labor intensive, periodic cleaning of the bottom substrate is required.

Since ammonia is the most toxic substance in aquarium water, it should be removed by culturing aerobic bacteria, which convert ammonia to nitrate and nitrite, and by culturing anaerobic bacteria, which convert nitrite to nitrogen gas. This idea was used in the Monaco-system, which is widely known among salt-water tank hobbyists. However, this system is not practical for relatively small aquariums at home or the office, since anaerobic degradation of organic substances also releases toxic chemicals such as sulfide gas.

The efforts in developing and improving water filtration systems of aquarium tanks in the past have been focused on how to effectively culture nitrogen-fixing bacteria flora on the filter materials to eliminate toxic substances such as urea, ammonia, nitrite, and nitrate. This idea was based on the misunderstanding of the major sources of nitrogen compounds. Animal metabolites including urea, creatine, amino acids and organic acids, which are generally water soluble, are not the major sources of pollutants in the water. The major source of pollutants is the insoluble materials that accumulate at the tank bottom, such as left over food, feces, dead animals and plants, and overgrown bacteria. These insoluble materials, which consist of proteins, lipids, carbohydrates and celluloses, are decomposed into small molecules such as amino acids, sugars, ammonia, urea, organic acids, nitrate, nitrite, sulfuric acid, sulfurous acid, etc. by bacteria in the water. Therefore, if debris accumulates at the bottom of the tank, the amount of pollutants released from the decomposed debris increases drastically.

In addition, overgrowth of bacteria in nutrition-rich water is another major problem, since these bacteria themselves become a source of nitrogen compounds and various kinds of toxic substances. The most effective method to remove the soluble toxic nitrogen compounds is to use plants in fresh water, and coral algae grown on live rocks and macro-algae in salt water. The effects are still underestimated and are not used widely.

Furthermore, bottom substrates such as gravel, coral sand and live rocks, provide enough surface area to cultivate bacteria flora, which degrade both soluble and insoluble organic substances. Therefore, the main purpose of a water filtration system should be the removal of insoluble organic debris from the tank before it degrades, rather than cultivating bacteria to facilitate the metabolism of nitrogen compounds.

SUMMARY OF THE INVENTION

The present invention provides a water filtration system or cleaning system, together with methods for its use, which allows for effective removal of insoluble debris at the bottom of an aquarium, thereby maintaining high water quality in the aquarium without intensive work.

In one embodiment, the inventive system comprises: (a) a water flushing tube adapted to be positioned at one end of the aquarium, the water flushing tube comprising a first generally vertical tubular member connected at one end to a hose for connection to a water supply or to a reverse power-head pump, and connected at the other end to a generally right-angled water jet tube, or connector, having an opening to be positioned in proximity to the base of the aquarium; (b) a water draining tube adapted to be positioned at the opposing end of the aquarium, the water draining tube comprising a second generally vertical tubular member being connected at one end to a hose for the drainage of water out of the aquarium and connected at the other end to a generally right-angled siphon tube, or connector, having an opening to be positioned in proximity to the base of the aquarium; and (c) a water circulation tube adapted to be positioned at the opposing end of the aquarium, the water circulation tube comprising a third generally vertical tubular member being connectable at one end to a filter located outside the aquarium and having an opening to be positioned in proximity to the base of the aquarium. In a preferred embodiment, the aquarium is provided with a gravel screen and the openings of the water flushing tube, water circulation tube and water draining tube are positioned below the screen.

In an alternative embodiment, the water flushing tube is connected to a horizontal tube which is placed along at least one inner side of the aquarium and which has multiple holes placed along its length. Preferably the holes face perpendicular to the bottom of the tank. Similarly, the water circulation and draining tubes are connected to a second horizontal tube having multiple holes along its length and which is placed along at least one opposing side of the aquarium. Preferably the holes in the second horizontal tube face down towards the bottom of the aquarium.

In the above inventive methods, water is passed through the water flushing tube, either from the water supply or by means of the reverse power-head pump, and directed towards the opposite side of the aquarium, thereby pushing debris accumulated on the bottom of the aquarium towards the water draining and water circulation tubes. Water and debris are then removed from the aquarium through the water draining tube into an external container or drain and/or through the water circulation tube to the filter. Preferably, water and debris are continually removed from the tank by means of the water circulating tube and debris is trapped by the outside filter, whereas clean water is returned into the aquarium through the water flushing tube. Furthermore, water and debris are removed from the aquarium to the outside, such as a sink, drain or containers, through the water draining tube as necessary.

In another embodiment, the inventive system comprises: (a) at least a first and a final filtration chamber which connect in series to each other and wherein the final filtration chamber contains an individual filter cartridge; (b) a water draining tube, which at one end is connected to the first filtration chamber, and at the other end has an opening which is adapted to be positioned at one end of the aquarium; (c) a pump located after the filtration chambers; and (d) a water flushing tube, connected at one end to the pump and which at the other end has an opening adapted to be positioned at an opposing end of the aquarium. Preferably, the inventive system comprises four filtration filters.

The two embodiments mentioned above use a closed, sealed water filtration system in order to avoid potential problems such as shut down of water circulation caused by a broken siphon or over flow of water caused by plugging of the water flow in the tube returning to the tank. By placing the power pump after the filtration chamber, no pre-filter is required to protect the pump from large solid materials, thus this system can be run continuously to siphon out insoluble debris that accumulates at the tank bottom. By using separate filtration chambers, which contain removable cartridges, the individual filter chambers can be cleaned independently. For example, the filter cartridge in the second chamber, which collects debris materials, can be easily replaced without disturbing other filter chambers, which are beneficial for bacteria growth.

Using the inventive system and methods, debris may be effectively removed from an aquarium without removing any objects, such as fish, live plants and gravel, thereby maintaining a high level of water quality cost-effectively and with minimal labor. The inventive system further enables effective use of the biological cleaning effect of plants, which utilizes animal waste. The water quality in aquariums with densely growing plants is much higher than in a bare aquarium. Using conventional filtering and cleaning systems, the accumulation of debris significantly increases after a certain period and overwhelms the plants' water cleaning ability. Using the inventive system, the accumulation of debris can be readily avoided by routine removal of debris at the aquarium bottom. When plants grow well, their nitrogen uptake is significant and much less water exchange is required.

The above-mentioned and additional features of the present invention and the manner of obtaining them will become apparent, and the invention will be best understood by reference to the following more detailed description, read in conjunction with the accompanying drawings.

DETAILED DESCRIPTION OF THE INVENTION

As outlined above, the present invention provides a water circulation and filtration system for the maintenance of a high water quality within an aquarium which permits automatic and effective removal of insoluble debris from the bottom of the aquarium.

Figure 1:
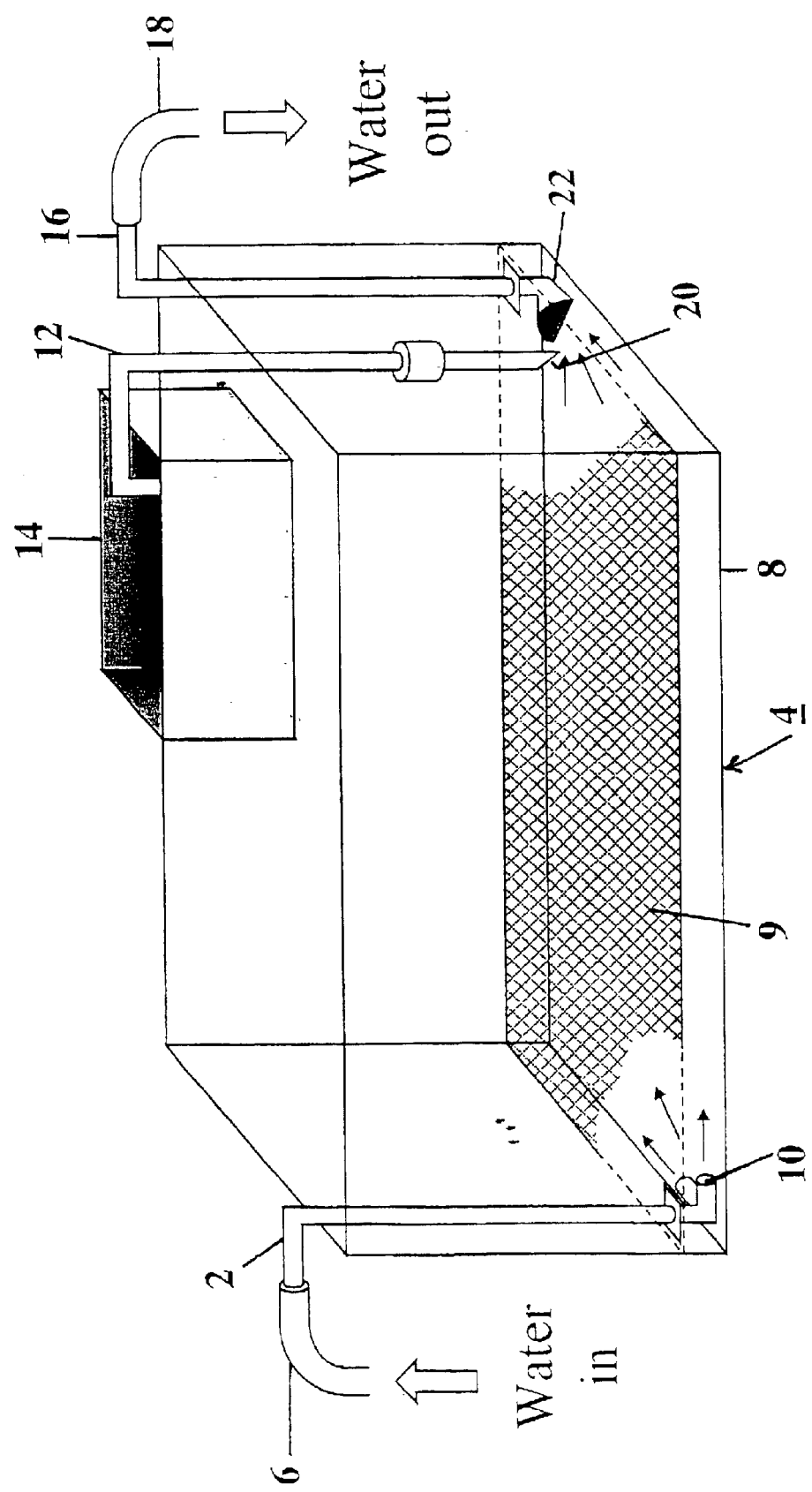
FIG. 1 is a perspective view of an aquarium containing a first embodiment of the water circulation system of the present invention.
Figure 6:
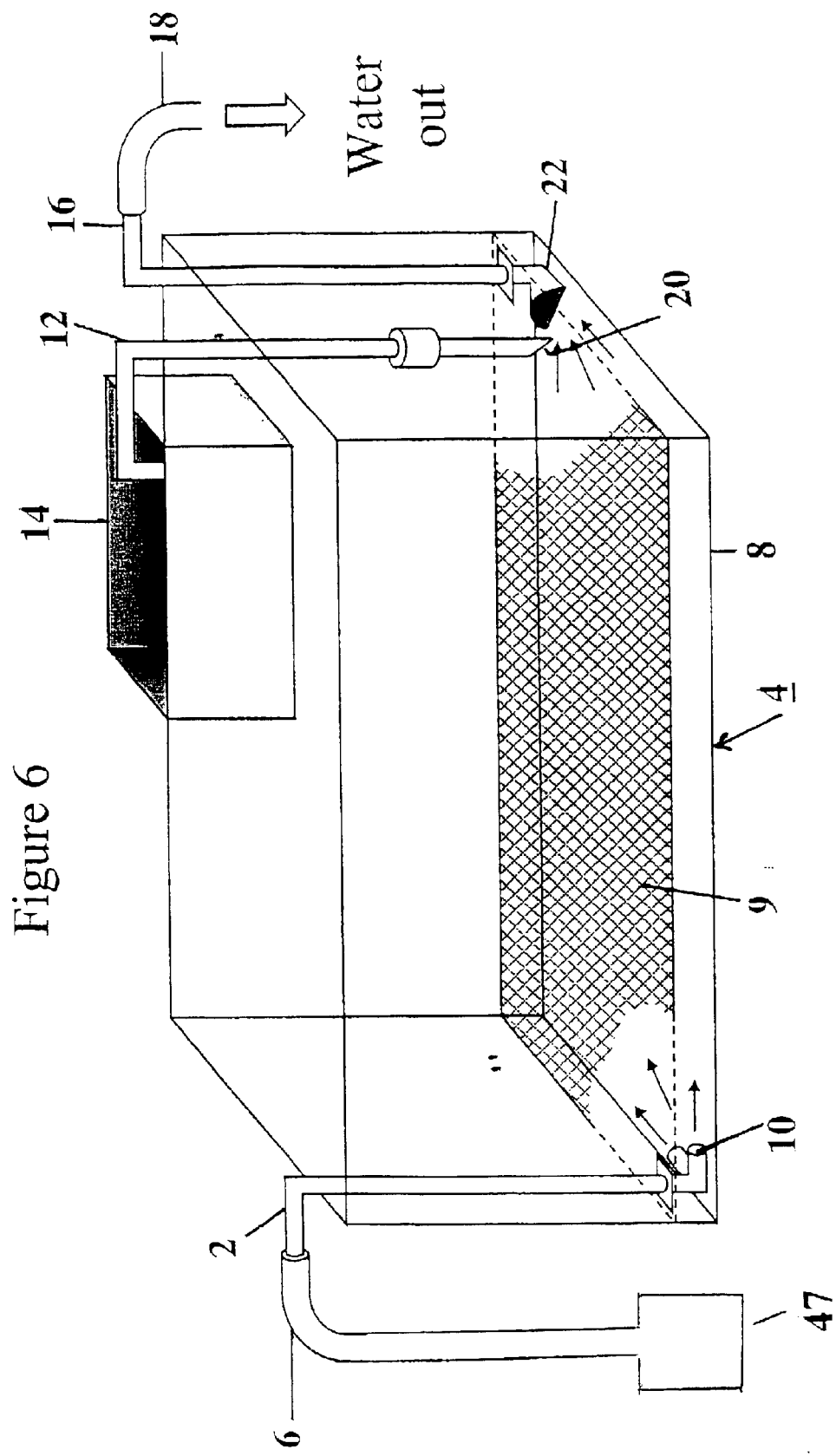
FIG. 6 is a perspective view of an aquarium containing a third embodiment of the water circulation system of the present invention.

The inventive system comprises a water flushing tube, a water circulating tube, and a water draining tube that all open immediately above the bottom of an aquarium. In the embodiment shown in FIG. 1, water flushing tube 2 is mounted generally vertically at one end of aquarium 4 and is connected by means of hose 6 either to a supply of water or to a reverse power-head pump 47 (see FIG. 6). Use of a reverse power-head pump 47 is especially beneficial for salt water aquariums, since fresh water, such as tap water, cannot be flushed. Aquarium 4 is preferably provided with a screen or mesh 9 for supporting gravel. Screen 9 is positioned at least 0.5 cm above, and substantially covers base 8 of aquarium 4. The screen is preferably constructed of round plastic rods, thereby reducing any dead-space, and maximizing water flow through the screen. Opening 10 of water flushing tube is positioned immediately above base 8 of aquarium 4 and below screen 9.

On the opposite side of aquarium 4, water circulating tube 12 is mounted generally vertically and is connected to an outside filter 14 which has a built-in pump (not shown) or to an outside power filter placed under aquarium 4 (not shown). Outside filter 14 and the power filter may be of any conventional design and act to remove debris from the water. Specifically, water goes to outside filter 14 through water circulating tube 12 and over flows into aquarium 4 from outside filter 14, which is placed on aquarium 4. Similarly, water is aspirated through the water circulating tube 12 to the power filter and pumped up to aquarium 4 from the power filter. Water draining tube 16, also mounted in a generally vertical orientation, is located in proximity to water circulating tube 12 and is connected by means of hose 18 to a sink, drain or external container. Opening 20 of water circulation tube 12 and opening 22 of water draining tube are positioned immediately above base 8 of aquarium 4 and below the screen. In an alternative embodiment, water circulating tube 12 and water draining tube 16, may be connected by a two-way stopcock.

Figure 3:
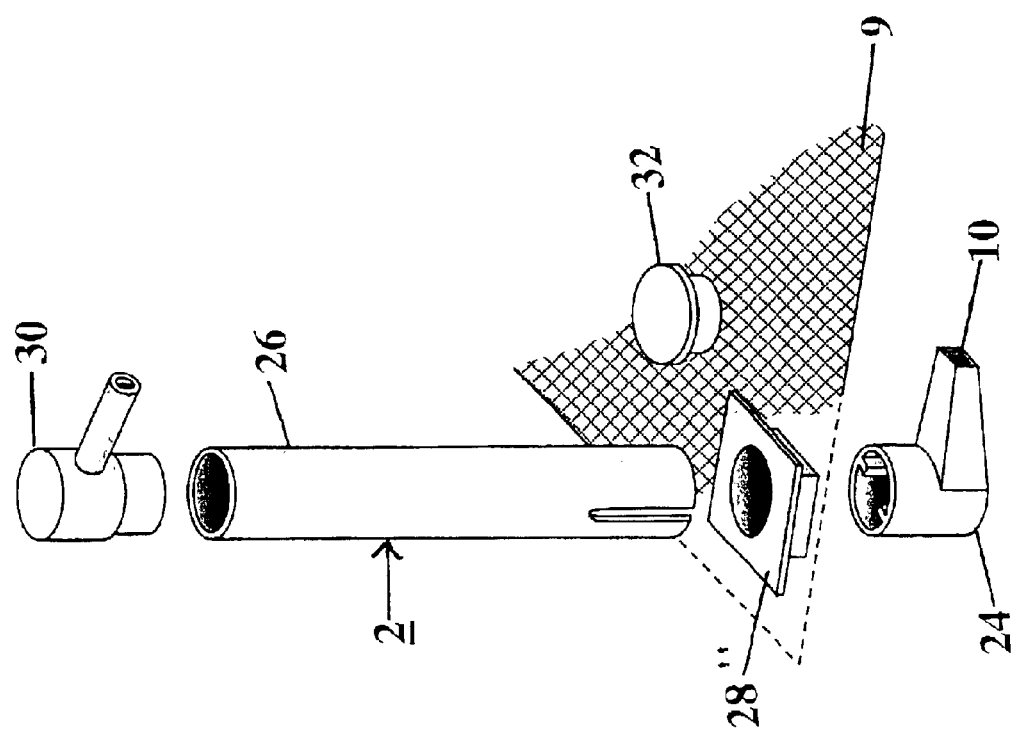
FIG. 3 is an exploded view of a water flushing tube of the present invention.
Figure 4:
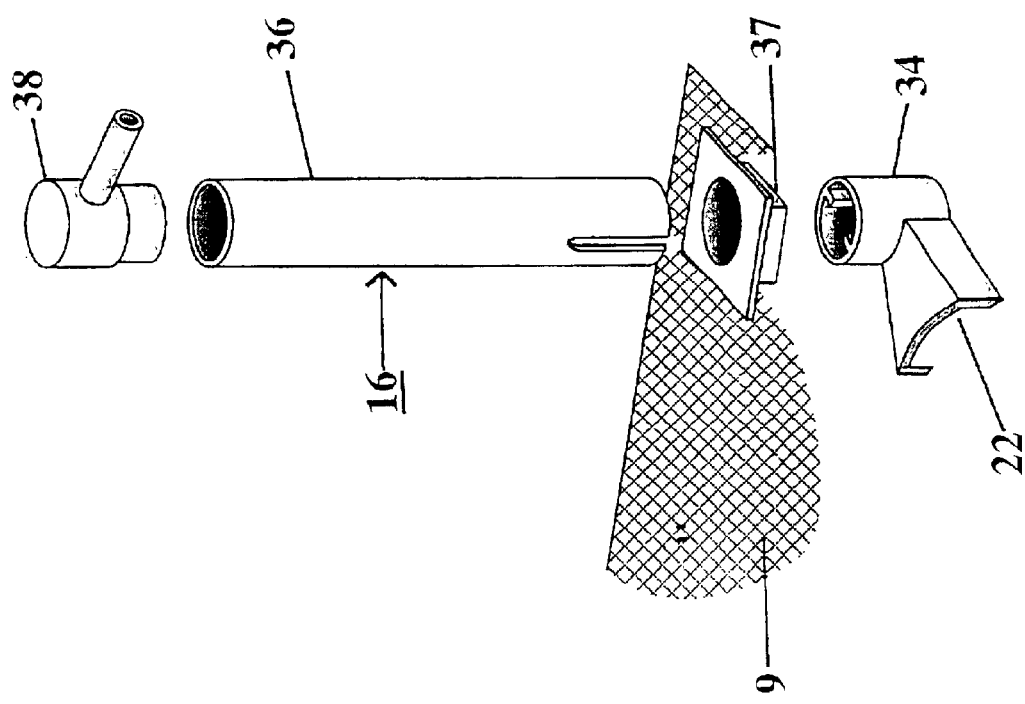
FIG. 4 is an exploded view of water draining tube of the present invention

As shown in FIG. 3, opening 10 of water flushing tube 2 is preferably provided on connector 24 which is movably mounted on the bottom of tubular member 26 and which may be rotated through an angle of around 90° in order to change the direction of flushing water. Water flushing tube 2 passes through, and is stabilized by, support 28 which is mounted on screen 9. A connecter 30 may be employed to connect tubular member 26 to hose 6 (not shown). In order to maintain the aesthetic quality of the aquarium, tubular member 26 may be removed and replaced with stopper 32 during daily operation. As shown in FIG. 4, water draining tube 16 is preferably constructed in a similar manner to water flushing tube 2, with a wide mouth opening 22 being provided on a connector 34 rotatable through an angle of 90° to permit changes in the direction of debris collection, the connector being mounted upon tubular member 36. Connector 38 may be employed to connect tubular member 36 to hose 18 (not shown). Water draining tube 16 may pass through and be stabilized by support 37 mounted on screen 9.

Figure 5:
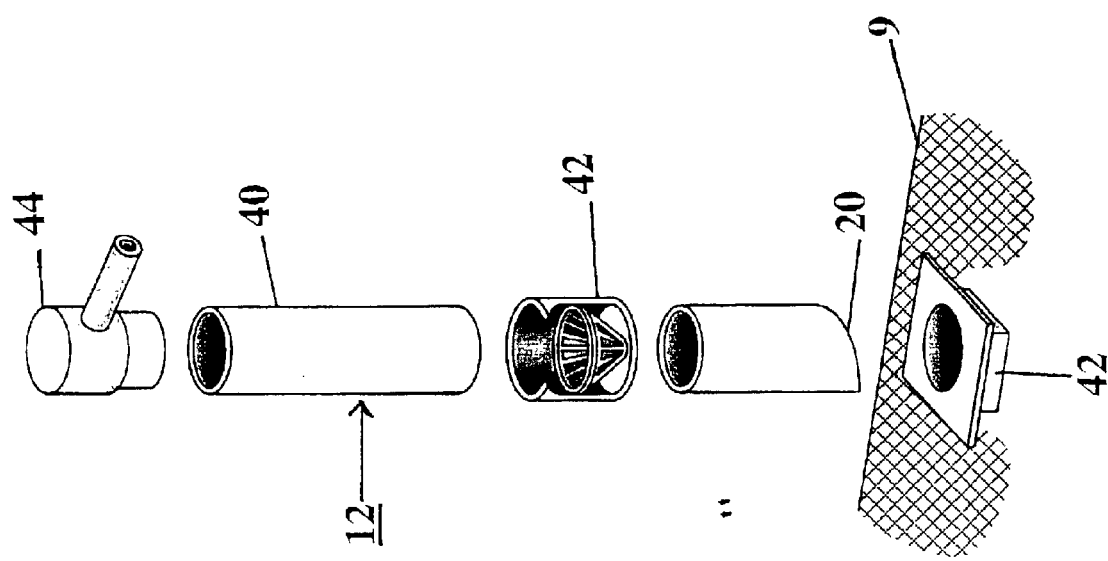
FIG. 5 is an exploded view of a water circulation tube of the present invention with a gravel block.

FIG. 5 shows an exploded view of water circulation tube 12. In the illustrated embodiment, water circulation tube 12 comprises a tubular member 40 having a gravel trap or block 42 to prevent gravel from being drawn up through water circulation tube 12 and into the outside filter. As with water draining tube 16, water circulation tube 12 may pass through and be stabilized by support 42 which is mounted on screen 9. Tubular member 40 may be connected to outside filter 14 directly or to a power filter by means of connector 44.

Water flushing tube 2, water circulation tube 12 and water draining tube 16 may be constructed of any rigid or semi-rigid material suitable for use in an aquarium, such as plastic or stainless steel, and preferably have a diameter of between 1–20 cm. The preferred diameter of the tubes depends, in part, upon the aquarium tank size.

In use, water is passed through water flushing tube 2 and into aquarium 4, thereby pushing debris accumulated on base 8 of aquarium 4 towards water circulation tube 12 and water draining tube 16. Alternatively, debris may be pushed towards water circulation tube 12 and water draining tube 16 by employing a reverse power pump connected to water flushing tube 2 to circulate the water in aquarium 4. The debris may then be siphoned out of aquarium 4 to a sink, drain or external container through water draining tube 16. In addition, by continually running a power pump connected to outside filter 14, debris at base 8 of aquarium 4 may be siphoned out through water circulation tube 12 into outside filter 14 twenty-four hours a day.

Figure 2:
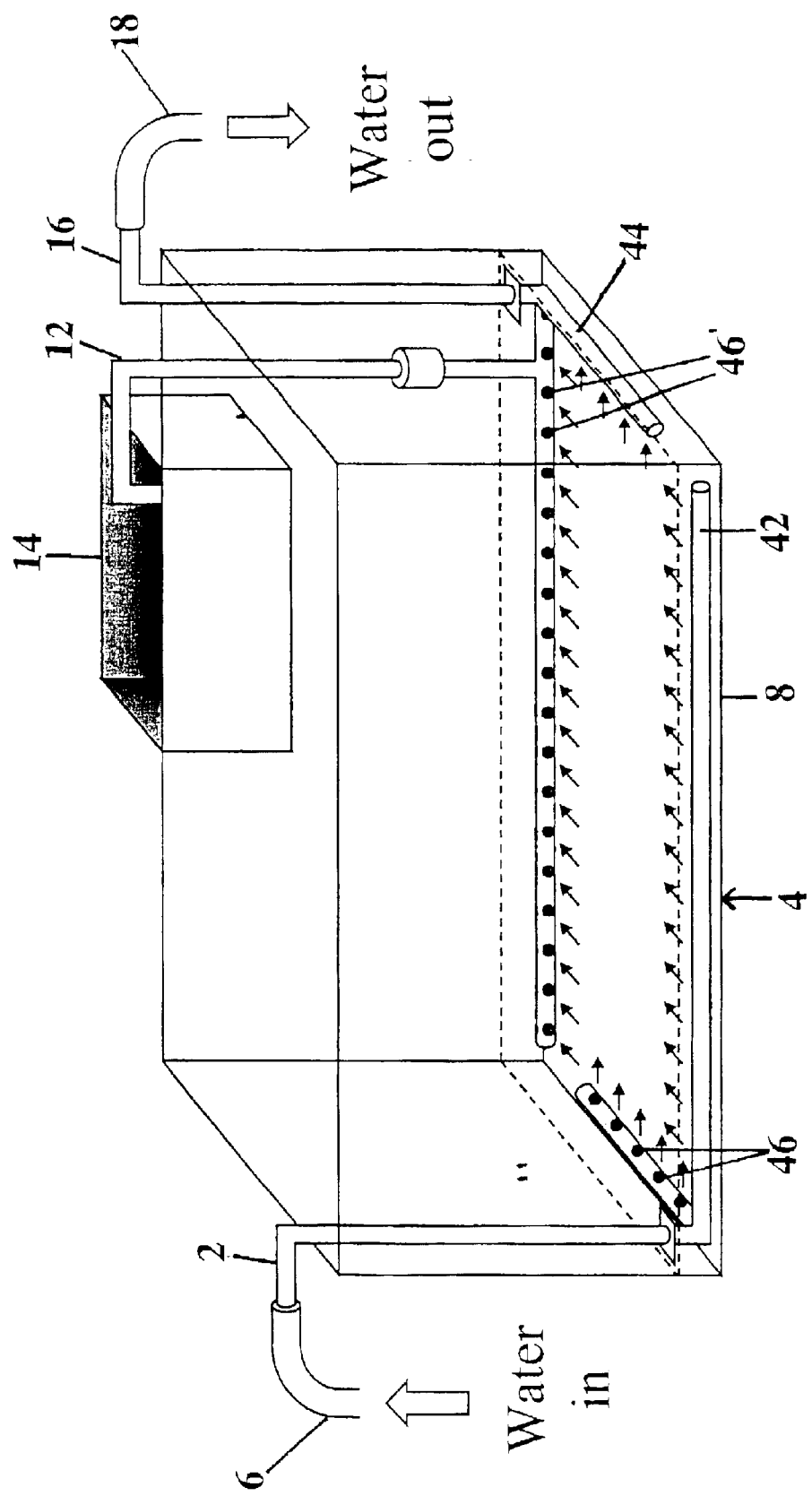
FIG. 2 is a perspective view of an aquarium containing a second embodiment of the water circulation system of the present invention.

In an alternative embodiment shown in FIG. 2, water flushing tube 2, water circulation tube 12 and water draining tube 16 are connected to horizontal tubes 42 and 44 located around the edges of aquarium 4 and between the screen and aquarium base 8. Horizontal tubes 42 and 44 contain multiple holes or perforations, 46 and 46' along their length, which preferably face aquarium base 8. Horizontal tubes 42 and 44 preferably cover substantially all the perimeter of aquarium 4. In use, water is passed through water flushing tube 2, through horizontal tube 42 and out of holes 46, whereby debris accumulated at aquarium base 8 is pushed towards horizontal tube 44. Water and debris are drawn into horizontal tube through holes 46', into water circulation tube 12 and/or water draining tube 16, and thus into outside filter 14 or into hose 18 for disposal in an external drain or container.

Figure 7:
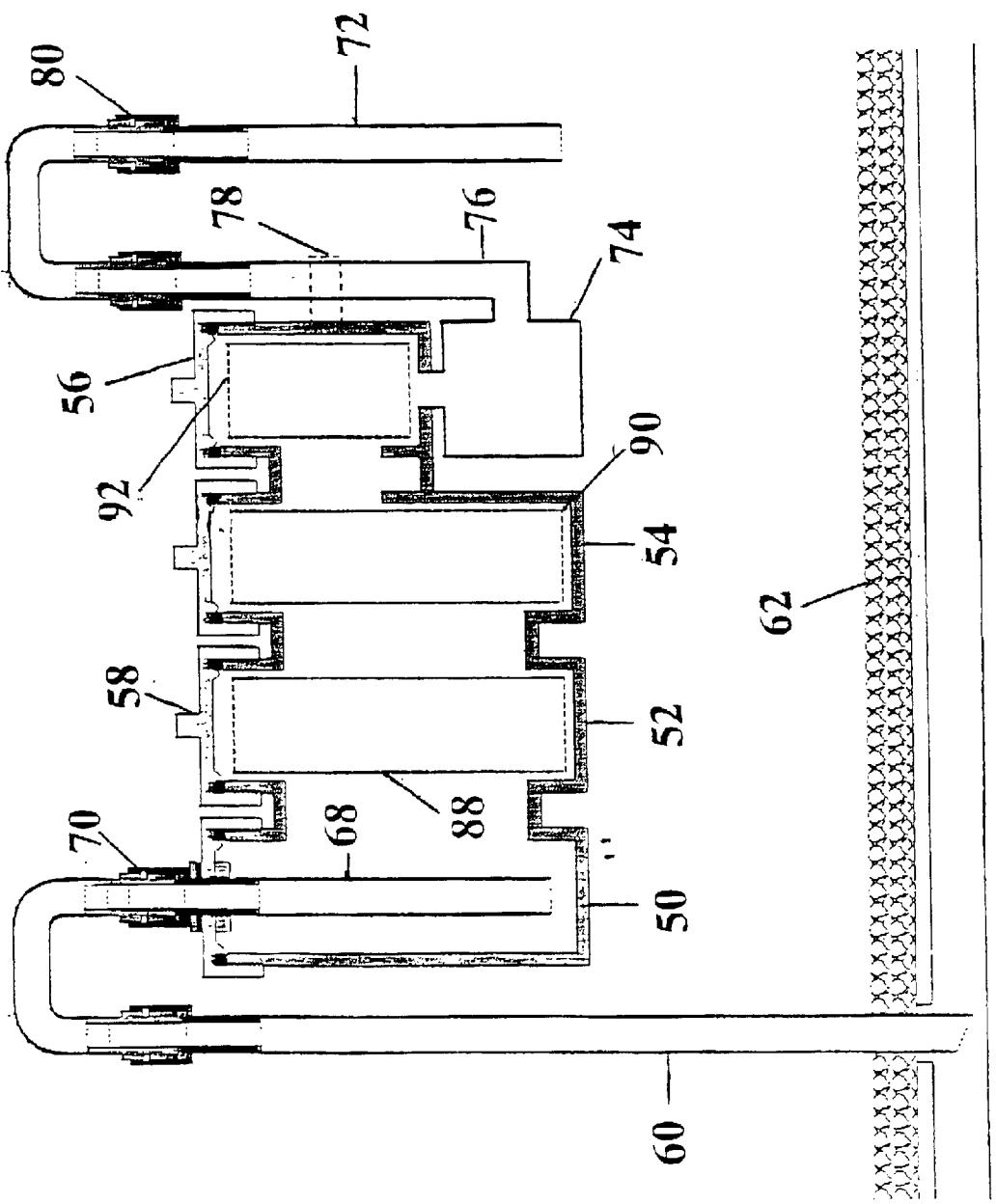
FIG. 7 shows a water filtration system with four independent filtration chambers, each containing a filter cartridge, and a power head pump attached to the fourth chamber.
Figure 8:
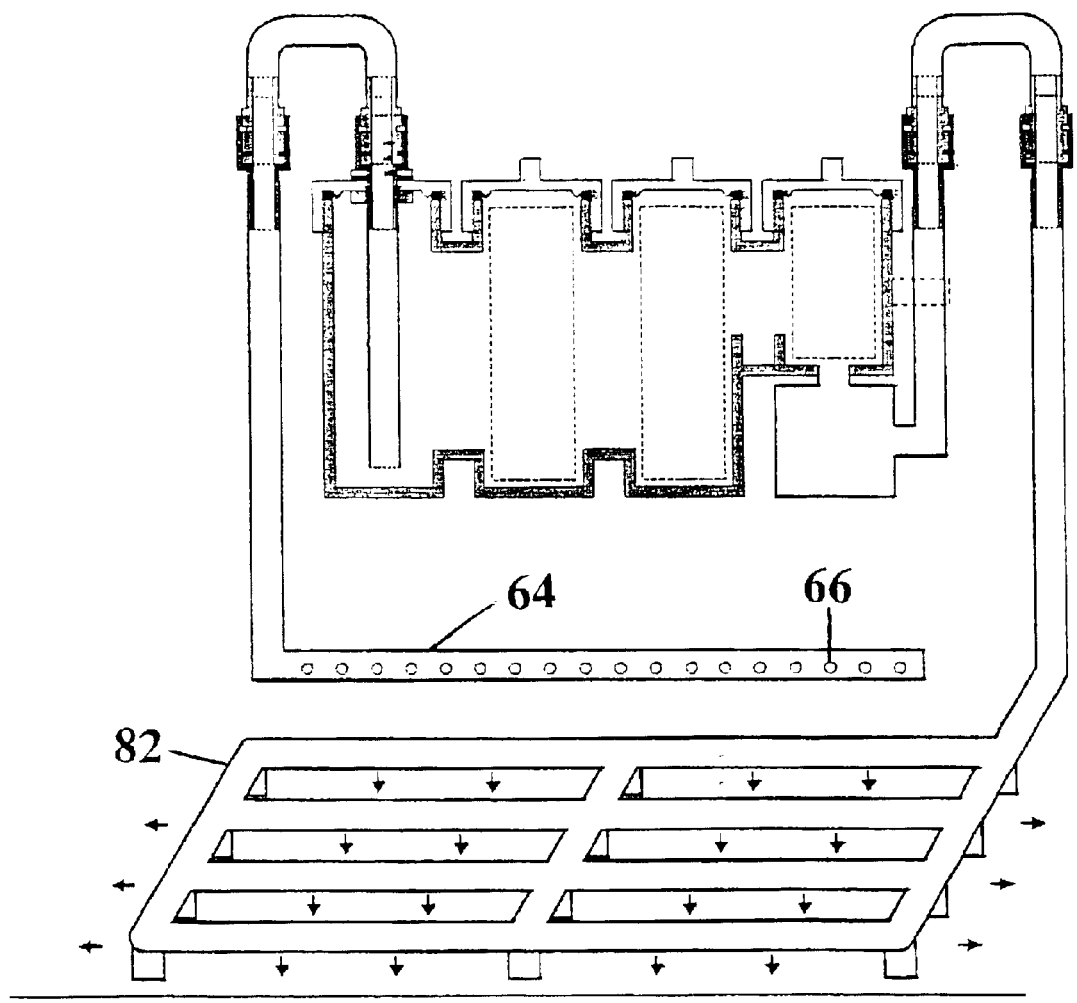
FIG. 8 shows an alternative embodiment of the system of FIG. 7.
Figure 9:
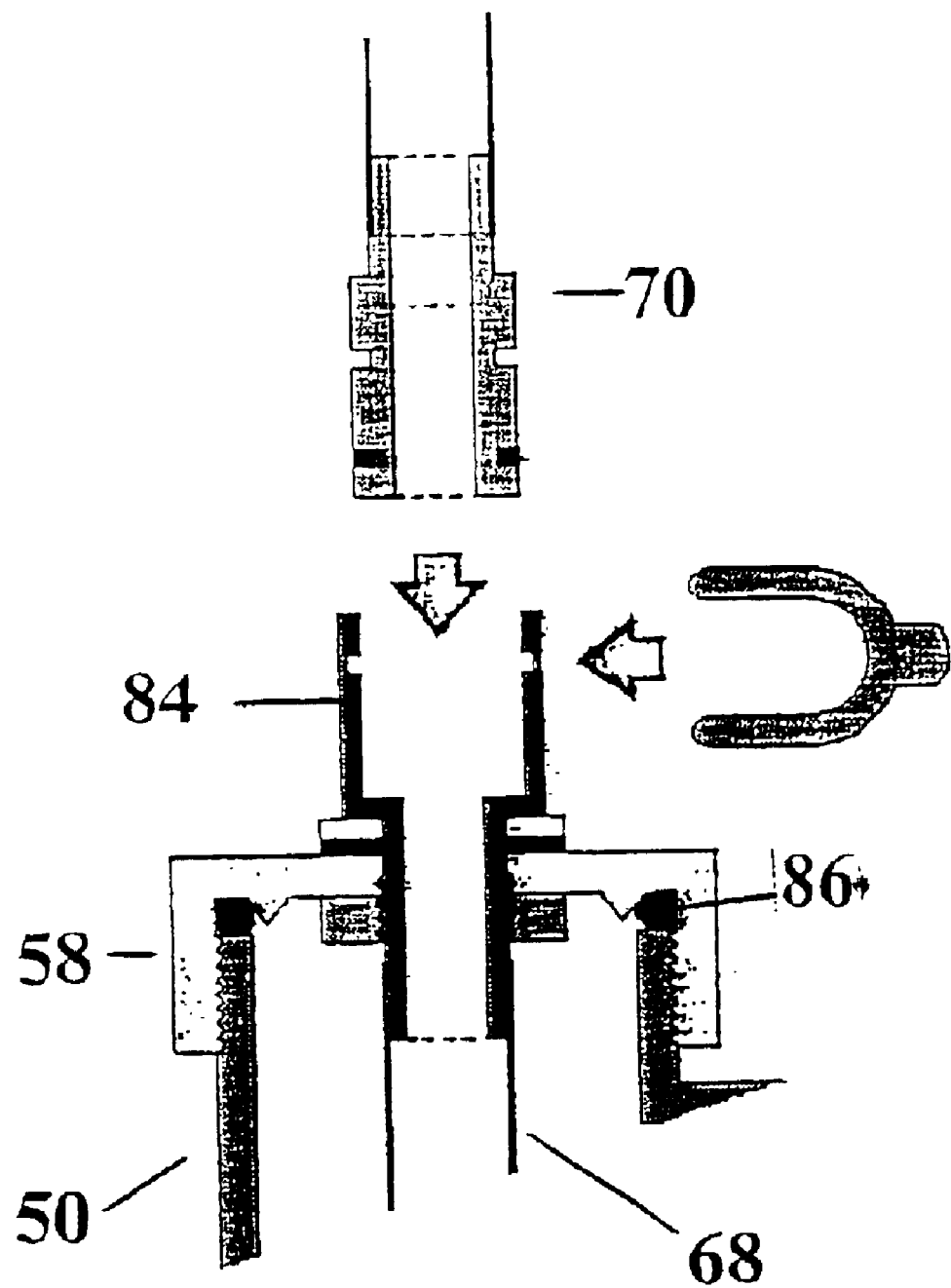
FIG. 9 is an exploded view of the detailed connection of the water-draining tube to a lid of one of the main filter chambers.

In another embodiment, the inventive water filtration system comprises multiple filtration chambers with a power pump positioned after the filtration chambers instead of in front of chambers. In the embodiment shown in FIGS. 7 and 8, main body of the filtration system is composed of 4 independent chambers 50, 52, 54, 56 with independent lids 58. The first chamber 50 is connected to water draining tube 60, which collects insoluble debris that accumulates under gravel layer 62 (FIG. 7), or which is connected to a horizontal tube 64 with multiple holes 66, which is suspended at the bottom of the aquarium tank. (see FIG. 8). The water draining tube 60 is connected to tube 68 inside of chamber 50 through a one-touch tube connector device 70 (FIG. 9). Water flushing tube 72 is connected to a power head pump 74, which is located beneath chamber 56, by means of water guide pipe 76, which is stabilized with a pipe clip 78. Water guide pipe 76 is connected to water flushing tube 72 through a one-touch detachable tube connecter 80. The water flushing tube 72 is open to the tank to create water flow in the aquarium (FIG. 7) or is connected to the horizontal tube network 82 with multiple holes (not shown) located at the bottom of the tank (FIG. 8). This creates water flow which agitates the bottom substrate such as corrals and, to prevent the formation of anaerobic aeras, which generally form under live rocks, and to disrupt the deposition of insoluble debris under live rocks and other decorations.

Chamber 52 and chamber 54 each contain a cartridge filled with filter material such as nylon or polystyrene fiber wool, and chamber 56 contains a cartridge filled with activated charcoal suspended in a fiber material such as nylon wool.

The lid of chamber 50 has a one-touch detachable tube connector 70 with a secure tube stopper 84 as shown FIG. 9, which connects the water-draining tube 60 by one touch and secures the connection. Chambers 50, 52, 54, 56 each have their own lid with a rubber O-ring 86 to seal tightly, and to open individual chambers independently, as necessary.

Using this filter system, water can be pumped into the first chamber 50 and then transferred to the second chamber 52. Insoluble debris is trapped by the filter material in cartridge 88 of chamber 52, and can be removed periodically by replacing the cartridge. The filtered water is then transferred to cartridge 90 in chamber 54 and from there to chamber 56 and is further purified.

Cartridge 90 of chamber 54 can be kept for a longer period of time to culture useful bacteria to degrade the organic substances into smaller molecules such as amino acids, ammonia, nitrate, nitrite or sulfuric acids and sugars. The amount of the final metabolites is drastically reduced by removal of the insoluble debris, the main supply source of organic material in the second chamber 52. In chamber 56, activated charcoal suspended in fibril materials effectively adsorbs a variety of water soluble organic substances such as proteins, lipids, certain amino acids and toxic substances produced by bacteria and animals, as well as a variety of metabolites released from animals.

The main body of filter, chambers 50, 52, 54, 56, may be mounted on the side of an aquarium by means of hinges (not shown).

EXAMPLE 1

Water flushing, circulation, and draining tubes (radius=20 mm) were mounted vertically and inserted through holes on a standard gravel screen to reach the tank bottom. The gravel screen was placed at 10 mm above the tank bottom. The water circulation tube was connected to a standard outside filter operating 24 hours a day. Three large Amazon Sword plants, five large Giant Sajitaria plants, and several small Chain Amazon plants, which are all resistant to high temperature, were placed in the tank. Water temperature was maintained at 80–82° F. Tap water treated with chloride neutralizer was used without adjusting the pH. One quarter to one third of the water was exchanged once per week. The following fish were kept together for more than 6 months in a 75-gallon tank: 10 discus, 30 cardinal tetra, and 6 orange tetra. Three different types of food (mainly frozen discus food supplemented with Tetra Min™ and Tetra Bits™) were fed two times every day.

Water was consistently clear despite frequent feeding, and the fish were always very healthy and grew rapidly. Two discus paired in this community tank, spawning every week for more than 6 months. They were separated into a 30-gallon tank with the same water filtration system. More than 90% of the eggs hatched consistently.

EXAMPLE 2

Salt water (d=1.240) was used to fill a 75-gallon tank. The water flushing tube (radius=20 mm) was mounted vertically and connected to a horizontal tube network with multiple holes, which was located at 30 mm above coral sand at the tank bottom. The water flushing tube was connected to a horizontal tube network with multiple holes beneath to agitate the coral sand constantly. Water close to the tank bottom was drained through the draining tube and filtered by the multiple filtration chamber system of FIG. 7, and then returned to the tank bottom through water flushing tubes by a power head pump, located beneath chamber 4 of the main filter assembly, 24 hours a day. When the water became clear, a small hung-on type protein skimmer, CRP BakPak, was set up and operated 24 hr a day. Partially cured live rocks (75 pounds) were placed on the horizontal net tubes and cultured at 25° C. for one month. Water, approximately 5 gallons, was changed once per week, and the filter material (polystyrene fiber wool) in the second chamber was washed once per week throughout the one-month experimental period. VHO fluorescent lamps (20 watt×4) were used for lighting for 12 hours a day from the first day of the experiment until the end of the experiment. After one month, the partially cured rocks were completely cured and the water ammonium level dropped to an undetectable level.

EXAMPLE 3

Two cleaning shrimps, three peppermint shrimps, 10 hermit crabs, 10 snails, two common clown fish and three blue green chromis were added to the aquarium of Example 2 with 75 pounds of cured live rocks. The animals were fed every day with frozen food in morning and dry flake food at evening. Water (5 gallons) was regularly changed every 2 weeks.

During the first month, it was observed that hairy red algae and yellow algae grew on the coral sand and the glass tank walls, respectively, and were removed by hand. However, they gradually disappeared following each partial water change. In the 3 rd month, all live rocks were covered with various kinds of coral algae with red, purple or green colors, indicating that this tank had been established. In the $4^{th}$ month, soft corals such green star polyp, zoanthird, purple mushroom and cappella, in addition to one yellow tang, which consume hairy algae, were added. This tank was maintained for more than 7 months without any changes in the maintenance schedule. All fish, shrimps, snails and soft corals remained healthy.

While in the foregoing specification this invention has been described in relation to certain preferred embodiments, and many details have been set forth for purpose of illustration, it will be apparent to those skilled in the art that the invention is susceptible to additional embodiments and that certain of the details described herein may be varied considerably without departing from the basic principles of the invention.

I claim:

1. A water cleaning system for use in an aquarium, the system comprising:
    (a) a water draining tube adapted to be positioned at one end of the aquarium, the water draining tube having a first and a second end, the first end having an opening adapted to be positioned in proximity to the base of the aquarium, and the second end being connected to a first filtration chamber;
    (b) a final filtration chamber connected in series to the first filtration chamber;
    (c) a pump connected to the final filtration chamber, the pump being located, in a direction of water flow, after the final filtration chamber; and
    (d) a water flushing tube adapted to be positioned at an opposing end of the aquarium, the water flushing tube having a first and a second end, the first end being connected to the pump and the second end having an opening adapted to be positioned in proximity to the base of the aquarium.

2. The water cleaning system of claim 1, further comprising at least one additional filtration chamber connected in series with the first and final filtration chambers, and being located, in the direction of water flow, between the first and final filtration chambers.

3. The water cleaning system of claim 1, wherein the final filtration chamber contains a filter cartridge.

4. The water cleaning system of claim 3, wherein the filter cartridge contains a material selected from the group consisting of: nylon wool; polystyrene wool; plastic sponge; and activated charcoal.

5. A water cleaning system for use in an aquarium, the system comprising:
    (a) a water draining tube adapted to be positioned at one end of the aquarium, the water draining tube having a first and a second end, the first end being connected to a first horizontal tube adapted to be positioned in proximity to the base of the aquarium, and the second end being connected to a first filtration chamber, wherein the first horizontal tube is sized to fit along at least one edge of the aquarium and has multiple openings spaced thereon;
    (b) a final filtration chamber connected in series to the first filtration chamber;
    (c) a pump connected to the final filtration chamber, the pump being located, in a direction of water flow, after the final filtration chamber; and
    (d) a water flushing tube adapted to be positioned at an opposing end of the aquarium, the water flushing tube having a first and a second end, the first end being connected to the pump and the second end being connected to a second horizontal tube adapted to be positioned in proximity to the base of the aquarium, the second horizontal tube being sized to fit along at least one edge of the aquarium and having multiple openings spaced thereon.

6. The water cleaning system of claim 5, further comprising at least one additional filtration chamber connected in series with the first and final filtration chambers, and being located, in the direction of water flow, between the first and final filtration chambers.

7. The water cleaning system of claim 5, wherein the final filtration chamber contains a filter cartridge.

8. The water cleaning system of claim 7, wherein the filter cartridges contains a material selected from the group consisting of: nylon wool; polystyrene wool; plastic sponge; and activated charcoal.

9. An aquarium having a water cleaning system of claim 5.

10. A method for maintaining water quality in an aquarium, comprising:

(a) providing a water draining tube at one end of the aquarium, the water draining tube having a first and a second end, the first end having an opening adapted to be positioned in proximity to the base of the aquarium, and the second end being connected to a first filtration chamber;

(b) providing a final filtration chamber connected in series to the first filtration chamber;

(c) providing a pump connected to the final filtration chamber, the pump being located, in a direction of water flow, after the final filtration chamber;

(d) providing a water flushing tube positioned at an opposing end of the aquarium, the water flushing tube having a first and a second end, the first end being connected to the pump and the second end having an opening adapted to be positioned in proximity to the base of the aquarium;

(e) draining water from the aquarium through the water draining tube and passing the water through the first and final filtration chambers, whereby debris is removed from the water to provide filtered water; and (f) flushing the filtered water through the water flushing tube, whereby debris accumulated on the bottom of the aquarium is pushed towards the water draining tube.

11. The method of claim 10, wherein the aquarium is provided with a gravel screen positioned above the base of the aquarium and the openings of the water draining tube and the water flushing tube are positioned below the gravel screen.

* * * * *